Feb. 23, 1971   G. R. SIMPSON ET AL   3,566,300
OPTICAL MEANS FOR PRODUCTION OF LASER EMISSION
Filed Jan. 31, 1962                            2 Sheets-Sheet 1
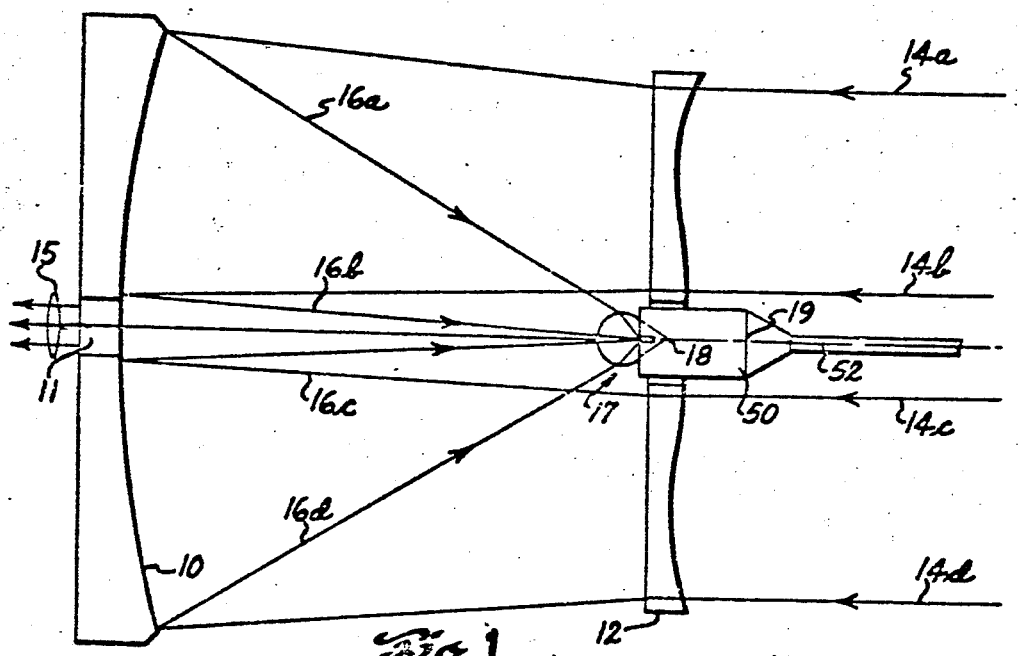
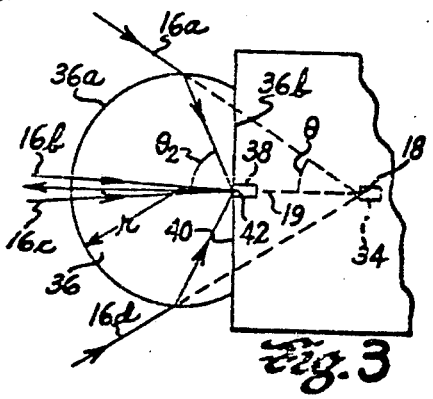
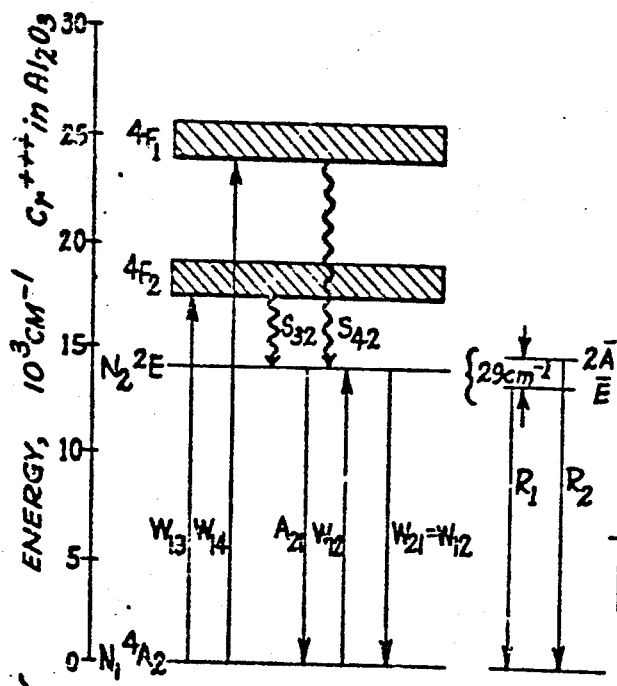
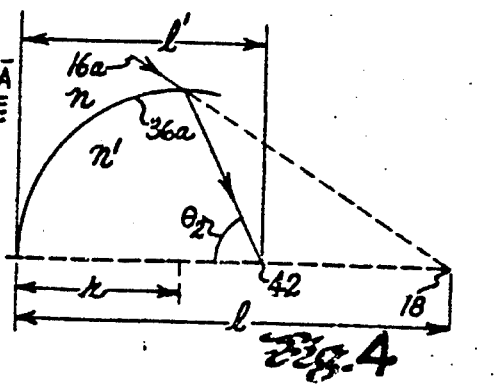
INVENTORS
GEORGE R. SIMPSON
ELIAS SNITZER
CHARLES J. KOESTER
BY
ATTORNEYS

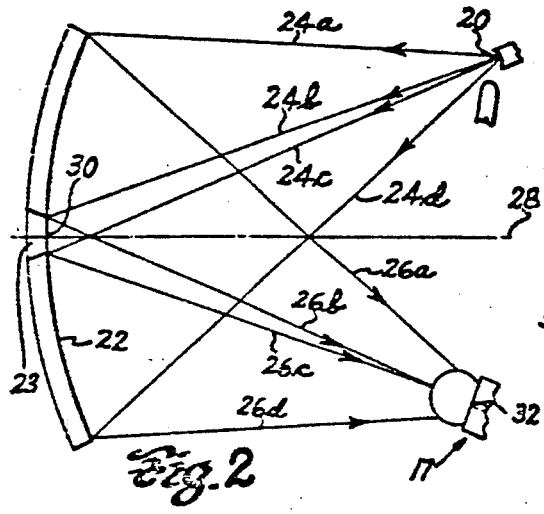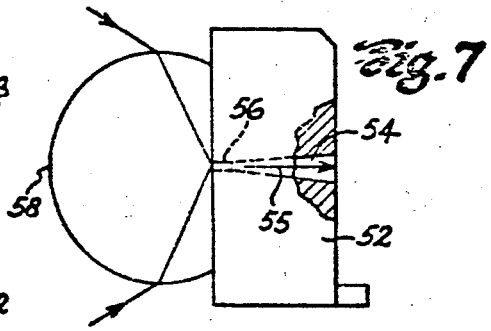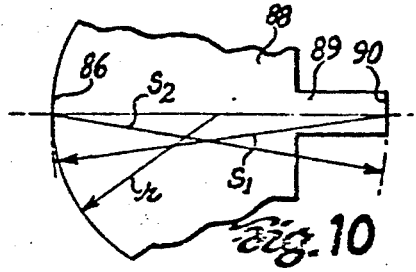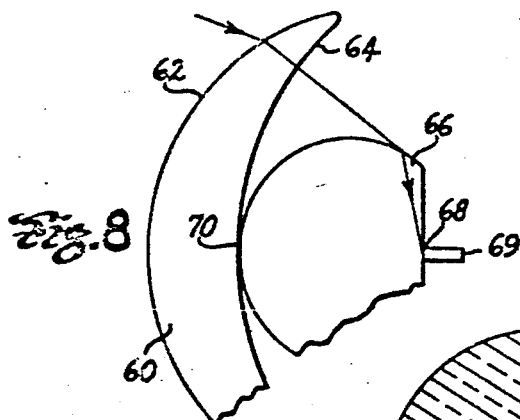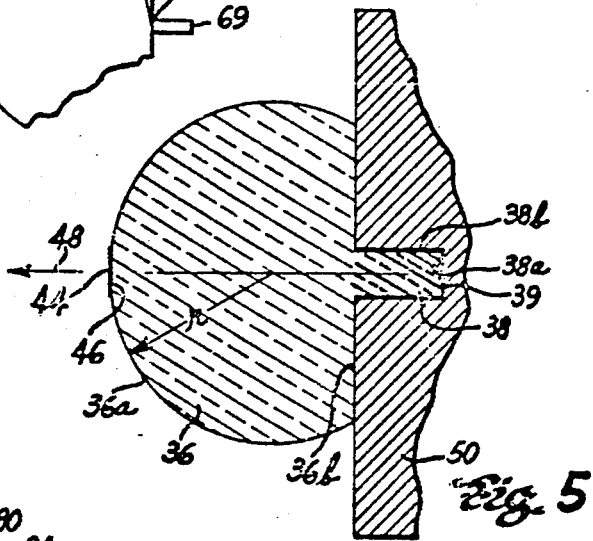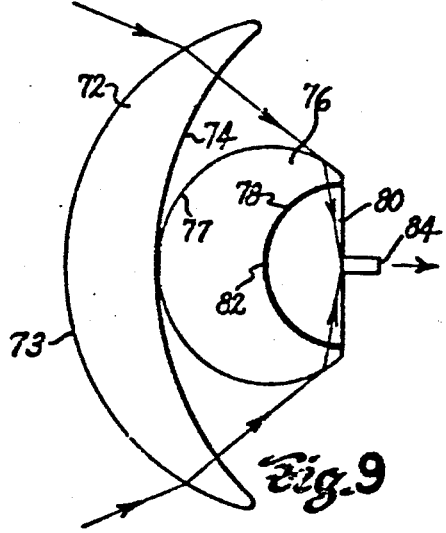
INVENTORS
GEORGE R. SIMPSON
ELIAS SNITZER
BY CHARLES J. KOESTER
ATTORNEYS

United States Patent Office 3,566,300
Patented Feb. 23, 1971

3,566,300
OPTICAL MEANS FOR PRODUCTION OF LASER EMISSION
George R. Simpson, South Woodstock, Conn., Elias Snitzer, Sturbridge, Mass., and Charles J. Koester, South Woodstock, Conn., assignors, by mesne assignments, to American Optical Company, Southbridge, Mass., a corporation of Delaware
Filed Jan. 31, 1962, Ser. No. 170,138
Int. Cl. H01s 3/02
U.S. Cl. 331—94.5      28 Claims This invention relates to laser constructions and the like, and more particularly to laser constructions embodying optical means including means for efficiently collecting radiant energy for laser pumping purposes from a high intensity light source and for directing said energy at high flux density and high numerical aperture into a solid laser component; said optical means including refracting means for immersing the laser component in a transparent material of high refractive index for increasing said numerical aperture. Said invention also includes means associated with said laser component for forming a highly efficient optical resonant cavity, means for controlling the direction and character of the laser emission and means operatively associated with one or both the laser component and the optical refracting means for efficiently dissipating from the construction heat energy which is generated during operation thereof.

Furthermore, the light-gathering and heat-dissipating characteristics of the parts of the laser construction of the present invention are of such design and such high efficiency relative to the size and weight of these parts that in certain specific embodiments of the construction, same may be employed in a space satellite or the like and operated continuously in outer space by pump power derived directly from the sun.

It is known that lasers, or optical masers as they are also called, require both an active laser material with a proper distribution of energy states and transition probabilities to permit amplification by stimulated emission of radiation as well as an appropriate optical resonant structure for confining some of the spontaneously emitted light to the region of the active material so that it can be amplified by stimulated emission. The resulting laser light emitted from such a cavity is highly coherent, and the present invention includes means for controlling and improving the directional transmission characteristics thereof.

A number of materials in solid form have already been discovered and used as active laser materials, and one of the most successful of these at the present time is pink ruby comprising from 0.02 to 0.05% by weight of chromic oxide in aluminum oxide ($Al_2O_3$). The resonant cavity structure of such a ruby laser was formed by having a pair of reflecting surfaces disposed in facing parallel relation to each other upon the opposite ends of the ruby so as to form, in effect, a Fabry-Perot interferometer cavity therebetween, and the pumping light energy for the laser was supplied through the side walls thereof. However, in an arrangement of this type, considerable difficulty has been experienced in being able to reach threshold; that is, a condition at which laser action is attained.

In any laser, there are several different conditions or factors which must be satisfactorily cared for in order to reach a threshold condition for laser operation. A very high pumping power must be supplied to the active laser material, and the dimensions of the component, the doping or concentration of active ingredient in the laser material and the internally reflective wall conditions of the laser cavity are parameters which should be optimized to bring about laser action. Also, when continuous laser action is desired, as in the instant application, heat conductivity and heat reflection from parts of the laser construction are also factors to be considered. Only when these various factors are properly satisfied will continuous laser emission be possible.

It has now been found that by following the teachings of the present invention that an efficient laser construction or assembly can be made and arranged to provide sustained or continuous laser operation using a known form of high intensity light source, such as a flash tube, a carbon arc, a high pressure arc or the sun as the pumping power, that the parts of the assembly can be constructed and arranged so as to efficiently dissipate the heat generated within the structure or reflect some of the heat rays before reaching the laser cavity in such a way as to allow continuous laser operation, and that the direction and character of the laser emission can be controlled so as to provide efficient use of the emitted laser energy.

It is, accordingly, an object of the present invention to provide a laser construction, laser assembly or the like embodying optical light-gathering and condensing means which are of high optical efficiency and arranged to be operated continuously by energy from a known high intensity light source as well as being provided with means for dissipating heat from the assembly and means for directing and controlling the emitted laser energy thereof.

It is an additional object of the invention to provide for such a laser construction or assembly optical means, including laser immersing means, of very high light-gathering efficiency, for pump power purposes and for directing the energy so gathered at very high numerical aperture onto the laser component.

It is also an object of the invention to provide in a laser construction of the character described means of high heat conductivity in efficient operative arrangement and engagement with the parts of the laser construction so as to dissipate the heat generated within the device rapidly and thus allow continuous laser operation thereof.

It is also an object to provide dichroic means or heat-absorbing means for aiding in reducing the amount of heat which reaches the laser component.

It is another object of the invention to provide a laser construction of the character described which is of such efficient construction and arrangement relative to its size and weight that it may be embodied within a space satellite or the like and be arranged to derive its pumping power directly from the sun while providing a continuous laser emission for communication purposes or the like.

It is a further object of the invention to provide an improved light-gathering or light-condensing system including refractive immersing means in intimate combination with a laser component.

It is also an object to provide in a laser construction an arrangement of parts wherein the resonant cavity structure which is formed in part by the laser component and in part by a refractive element of the assembly; such as in the construction of a laser oscillator, laser amplifier or the like.

Other objects and advantages of the invention will become apparent from the detailed description which follows when taken in conjunction with the accompanying drawings in which:

FIG. 1 is a diagrammatic showing of a laser construction or assembly employing a Schmidt type reflecting condensing system and which is arranged to derive its pumping power as substantially parallel light directly from a high intensity radiant energy source such as the sun;

FIG. 2 is a diagrammatic showing of a laser construction or assembly employing a different form of light-collecting and condensing system, and which is arranged for laser operation by pump power from a conventional near-by high intensity source such as a carbon arc, a high pressure mercury arc or the like;

FIG. 3 is an enlarged showing of a portion of the laser structure of FIGS. 1 and 2 for use in describing details of the invention;

FIG. 4 is a sketch for use in explaining the invention;

FIG. 5 is an enlarged sectional view of a part of a laser construction such as might be used in the assembly of FIGS. 1 and 2;

FIG. 6 is an energy level diagram for ruby as the active laser material which may be used in the laser construction of the present invention;

FIG. 7 is a fragmentary showing of a slightly modified form of laser construction embodying the invention;

FIGS. 8 and 9 are showings of modifications which may be used in assemblies of the types shown in FIGS. 1, 2 and 7; and FIG. 10 is a further modified form of structure which may be used in carrying out the present invention.

Referring to the drawings in detail and in particular to FIG. 1, it will be seen that a relatively large concave spherically curved front surface mirror is shown at 10 and this mirror is arranged in optical alignment with a Schmidt-type aspheric corrector plate 12, so that substantially parallel light rays, such as rays coming from the sun, and indicated at 14a–14d, will be reflected and directed thereby as a convergent beam of light rays 16a–16d toward the principal focal plane of the mirror at 18 on the optical axis 19 and will tend to form a small real image of the light source at this location.

As is well known, such a spherical mirror and aligned Schmidt corrector plate have the ability and advantage of being able to form a substantially spherical-aberration-free image of a distant object field at a relatively high numerical aperture at an image plane within the system. Since a concave parabolic front surface mirror also is capable of forming an image of such an object which is substantially free of spherical aberration and at a relatively high numerical aperture, it could as readily be used in place of the mirror 10 and plate 12 in the arrangement of FIG. 1, if desired. Moreover, this latter arrangement at times might be preferred particularly when the actual weight of the laser parts is material, as will be mentioned hereinafter.

In FIG. 2 is shown a somewhat different arrangement of parts for directing light from a high intensity light source at high numerical aperture and high flux density into a laser component or system 17. One decided difference in this modified arrangement, when compared with that of FIG. 1, resides in the fact that the light source is a near-by light source rather than one disposed at a distance.

Since light rays from a small light source, if located at the center of curvature of a spherical mirror, will be reflected by the mirror directly back to its center and will tend to form an aberration-free image of the source at this location, it is possible, as shown in FIG. 2, to position a suitable light source such as the crater 20 of a DC carbon arc laterally a short distance to one side of the center of curvature 28, while maintaining the distance to the center 30 of the mirror surface unchanged and thus have the mirror tend to form an image of this light source at an equal distance from the mirror and at a point an equal amount to the opposite side of said center of curvature. Thus, light rays 24a–24d from the center of the crater 20 facing the mirror 22 will be reflected by the mirror 22 as a convergent beam of light rays as indicated at 26a–26d toward an image at the plane of focal point 32; and an image, if formed at this point, will be fairly free of optical aberrations. Other high intensity light sources might also be used such as flash tubes, high pressure mercury and xenon arcs and the like.

In place of the spherical reflecting system of FIG. 2 for a near-by light source, a pair of aligned high-speed refracting condenser elements of conventional type might be used for forming an image of the light source. However, since highest numerical apertures can be obtained by the reflecting types of systems with freedom from absorption, coma and third order astigmatism, the latter are preferred. However, even when using any one of these efficient light-collecting systems, one of the major problems in obtaining laser action (continuous or intermittent), in a laser component, such as in ruby of the type mentioned above, is the difficulty of getting a high enough flux density in the pumping light being directed into the component so that the amount of energy absorbed per each unit volume of active laser material in the laser cavity will be above the threshold value for the material.

Thus, if a laser component were disposed at the plane of the focal point 18 in FIG. 1 (or at the point 32 in FIG. 2) so as to be illuminated directly by the light from the mirror forming an image of the light source at this location and if this component were made of such a cross-sectional size as to be substantially equal to the size of the image of the light source at this location, then even with the most efficient of reflecting or refracting light-condensing systems of the types mentioned above and with the highest of numerical apertures and with very high intensity light sources, difficulty may still be experienced in providing a high enough flux density to reach the threshold value for the active laser material of the component.

The numerical aperture of a system may be defined as the product of the refractive index of the medium in which the steepest ray through the system is travelling and the sine of the angle of this ray relative to the optical axis at the image plane of the system. Therefore, the maximum flux density, H, at any point in the light source image formed by mirror 10 can be expressed in terms of the radiance of the light source by the following equation:

$$H = \pi B (n \sin \theta)^2 \qquad (1)$$

wherein $\theta$ is the maximum angle of the illuminating rays through the system, $n$ is the refractive index of the material through which the ray is travelling to the image plane, and B is the radiance or brightness of the source, and may be expressed in watts per square centimeter per steradian.

Therefore, if a laser component were disposed in air at the location 18, such as is suggested by the dotted outline 34 in FIG. 3, so as to have its entrance surface receive the focused light directly from the mirror 10 and at a maximum illumination angle $\theta$, as indicated by the dotted line extensions of the light rays 16a and 16d, and should it be found that at the entrance surface, the flux density is not as high as desired, it should be appreciated from Equation 1 that since the refractive index of air is equal to 1.0, there are only two other factors in the equation which might be considered in attempting to increase the flux density of the light incident upon the laser component.

Generally speaking, it is not feasible to consider trying to increase the value of the factor B in the equation since the light source will already be operating at its maximum output. Also, even if the angle $\theta$ were increased to its limit of 90°, not too great an increase in flux density would be gained since the sine of 90° is 1 and thus the square of ($n \sin \theta$) would only be 1.

It has been found, however, that if the entrance surface of the laser component is immersed in a transparent medium of a higher index than air, such as in glass, or, better still, in sapphire which has a relatively high refractive index of 1.77 the value of $n$ of Equation 1 will be materially increased thereby increasing the flux density incident upon the end of the laser material by a factor proportional to $n^2$.

Thus, there is also shown in FIG. 3 a refractive optical element 36 formed of a transparent material such as glass or a crystal and preferably of a relatively high refractive index and arranged with the entrance end of a laser component of active laser material 38 in fused, cemented, glass-soldered, or integral relation with the exit surface 40 of the element and thus so as to be in intimate optical contact, or the like, therewith. In a preferred construction, the laser component 38 would be formed of ruby (of 1.77 refractive index), the optical element 36 would be formed of sapphire (of 1.77 refractive index) and they would be formed or "grown" in known manner integrally with each other so that, in effect, no optical interface would exist therebetween.

As shown in the arrangement of FIG. 3, the light rays 16a–16d from the reflector 10 will be refracted inwardly toward the optical axis 19 as they enter the optical element 36 and will be immersed in the material forming the element as they reach focal point 42 at the entrance end of the laser component 38 at a materially increased angle $\theta_2$. Thus, a numerical aperture of as high as 1.77 can be obtained at the entrance end of the laser component.

Preferably, the refractive optical element 36 should collect the nearly spherical-aberration-free rays 16a–16d from the light-condensing system and bring same to as good a focus as possible at the plane of the entrance end of the laser component, and, for this purpose, element 36 should be made in the form of an aplanat which has the properties of satisfying the sine condition, and, thus, will form an image which is substantially free from spherical aberration, coma and third order astigmatism since the image is of small size. As shown, the front hyperhemispherical surface 36a of element 36 is of such radius and so spaced from the rear surface 36b thereof as to focus the light rays at the plane of this rear surface.

In FIG. 4 are diagrammatically shown the relations which will exist in such a case. Entering ray 16a at the refracting surface 36a of the element 36 will be refracted to the axial point 42 instead of travelling undeviated to point 18. If $r$ is the radius of curvature of the first or front refracting surface of the aplanatic element 36 and $n'$ is its refractive index, if $l$ is the axial distance from the front vertex of the refracting element to the point 18 and $l'$ is the axial distance from the vertex to the point of interception of this refracted ray with the optical axis, then $nl=n'l'$ and the value of the radius of the refracting surface will be:

$$r = \frac{nl}{n+n'} \qquad (2)$$

In FIG. 5, the refracting element 36 and the laser component 38 are shown on an appreciably larger scale. In fact, here the laser component, indicated by heavier cross-sectioning, and the refracting element, indicated by the lighter cross-sectioning, are shown as being integral, and would preferably be formed, respectively, of ruby and of sapphire since both have the same very high refractive index and both are crystals formed basically of aluminum oxide and may be "grown" synthetically as a single integral unit. Thus, an optical interface therebetween will be avoided.

As will be discussed more fully hereinafter, the cross-sectional size of the laser component and its length (parallel to the axis 19) will be carefully considered and controlled in accordance with its doping (concentration of active ions) and with the pumping power which is to be supplied to its entrance end by the refracting element. The flat rear or inner polished end 38a of the laser component and the polished cylindrical side walls 38b thereof are coated with a highly reflective and highly heat-conductive layer 39 of a suitable material such as a metal and preferably silver. The coated inner surface 38a serves to form one reflective surface of an optical resonant cavity and an opposed reflective layer for effecting such a cavity is provided at 44 on a flattened surface 46 on the element 36 at the vertex of the spherical surface 36a.

While surfaces 38a and 38b are highly reflective and nontransmittive, the layer 44 is highly reflective and provided with a relatively small amount of transmission, in the neighborhood of 2% or so. Thus, the arrangement of the structure is such that even though the active laser material, for example, ruby, is spaced appreciably from the reflective surface 44, nevertheless, a Fabry-Perot interferometer type of resonant cavity is formed between surfaces 38a and 44 and laser action will occur therebetween, and laser emission will take place outwardly through the layer 44 in the direction indicated by the arrow 48; and, of course, in order to accommodate this emission the reflector 10 of FIG. 1 can be centrally apertured as indicated at 11 and the reflector 22 of FIG. 2 can be centrally apertured as indicated at 23. Also, light-collimating lens or the like 15 (FIG. 1) may be disposed outwardly of this aperture, if desired.

It is, accordingly, possible by this disclosed arrangement to provide what may be called an end-pumping laser design wherein the pumping light, as indicated by rays 16a–16d at relatively high numerical aperture from the mirror 10 in FIG. 1 (or rays 26a–26d from mirror 22 in FIG. 2) are refracted at the entrance surface of the optical element 36 and directed at even higher numerical aperture, in the neighborhood of 1.77, through this element as an immersing medium of high index into the laser component in optical contact, or integral relation therewith.

The arrangement has the advantage that the coated side walls 38b and even the coated end wall 38a serve as means for rapidly or efficiently transferring the heat generated in the laser component during laser emission away from the component. To aid in this respect, a heat collector or heat sink 50 of heat-conductive materials such as silver or copper is formed closely about or even cast about the refractive coating on the laser component for better heat conductivity and, as indicated at 52 in FIG. 1, this collector or sink may be provided with conduit means for supplying a liquid coolant to and for conducting the coolant away from the heat sink. The heat sink will be provided with suitable cooling ducts therein (not shown) for circulating the coolant therethrough.

If the sun, for instance, is considered as the high intensity pumping light source, in order to achieve laser oscillation, that is, to reach a threshold condition in the ruby, the difference $(N_2-N_1)$ in the number of active atomic systems per unit volume in the upper ($^2E$) and lower ($^4A_2$) energy states (see the energy level diagram of FIG. 6), must be sufficiently large so that the light given off by the induced emission exceeds the losses in the laser cavity. In the diagram, the arrows with W's and different subscripts refer to the induced absorption or emission between the levels indicated, the $A_{21}$ arrow refers to the spontaneous emission between the levels indicated and the arrows with S's and different subscripts refer to the non-radiative transitions between the levels indicated.

Ruby, as is well known, has two strong energy absorption bands, one in the green and the other in the blue parts of the visible spectrum at 5500 A. and 4100 A. respectively. Absorption in these two bands leads to fluorescence in the $R_1$ and $R_2$ lines of the spectrum at 6943 A. 6929 A., respectively. Quantum efficiency for fluorescence with absorption in the green band may be taken as 100%, and the laser emission takes place primarily in the $R_1$ line.

Since the laser oscillation involve a trasition to the ground state $^4A_2$, in a perfectly lossless cavity, the threshold pump power will be that which is necesary to make $N_2=N_1$.

It has been shown by published articles dealing with the physical characteristics of ruby as a laser material that laser action will occur when the pumping light incident on side wall surfaces of a cylindrical rod of ruby has at least 500 watts per square centimeter. See, for example, the article published Aug. 15, 1961, in the name of T. H. Maiman et al. in Physical Review, vol. 123, starting on p. 1151 and entitled "Spectroscopy and Stimulated Emission in Ruby." This means that for a thin rod, the flux density from all directions approaches 1,000 watts per square centimeter. In order to have such an intensity or higher intensity in all parts of an end-pumped laser, such as that disclosed at 38 in FIG. 5, the flux density entering the end of the laser component must be sufficiently high to overcome the losses within the laser component due to absorption along the length thereof.

If the flux density entering the end of such a rod is $F_o$ watts/cm.$^2$, then, to a first approximation, the flux density at a distance $x$ along the rod is:

$$F(x) = F_o e^{-\alpha x}$$

where $\alpha$ is the absorption coefficient.

If there is a perfect reflector at the far end of the rod, the flux density at any point $x$ and considering total energy for both directions in the rod is:

$$F(x) = F_o(e^{-\alpha x} + e^{-\alpha(2L-x)})$$

where L is the length of the rod.

For ruby, we substitute the values $F(x) = 1000$ w./cm.$^2$, $\alpha = 1$, cm.$^{-1}$, $L = 1$ cm. and $x = 1$ cm. Then $$F_o = \frac{1000}{e^{-1} + e^{-1}} = \frac{1000}{2.363} = 1350 \text{ w./cm.}^2$$

In one square meter of sunlight at a location outside the atmosphere, there is approximately 350 watts of energy in the pumping wavelength bands. Taking into account losses in the collecting optics, about 250 watts can be delivered to the image of the sun. Without the advantage of immersion as taught by the instant disclosure, the smallest image which can be formed is 0.525 cm. in diameter or an area of .217 cm.$^2$. This gives a flux density, $$F_o = \frac{250}{.217} = 1150 \text{ w./cm.}^2$$

This value, it should be appreciated, is not high enough to give the required flux density of 1350 watts/cm.$^2$, as specified above.

With immersion optics providing a N.A. (numerical aperture) of 1.72, the image diameter is .306 cm., or an area of .074 cm.$^2$. Then $$F_o = \frac{250}{.074} = 3400 \text{ w./cm.}^2$$

which amount is well above that required for laser action.

Since an absorption of approximately 20 percent will occur in the pumping bands for ruby in solar energy reaching the earth's surface at an angle approximately normal thereto, it follows that even though the flux density will be reduced to approximately 2720 watts/cm.$^2$, nevertheless, laser action in the immersed laser component 38 of the instant invention will occur.

Among other solid materials besides ruby which have been lasered include divalent samarium in calcium fluorride, trivalent uranium in barium fluoride, trivalent uranium in calcium fluoride, neodymium in barium crown glass and neodymium in calcium tungstate.

In FIG. 7, a somewhat modified construction is shown and is such as to allow laser emission to take place in a direction opposite to that in FIGS. 1, 2 and 3. In this arrangement, the heat sink 52 is provided with a central bore 54 for the laser light to be emitted therethrough, as indicated by arrow 55, and the reflecting coating 56 on the laser component is arranged to have a 2% transmission while the opposed coating 58 is non-transmittive.

In FIG. 8, a modified form of refracting aplanatic optical system is shown. In this modified arrangement, a meniscus aplanat formed for a crown glass of 1.617 refractive index is shown at 60 and is provided with an aplanatic front surface 62 arranged to refract the light rays from the reflector 10 or 22 and incident thereon through the meniscus so that same, in passing through the rear surface 64, will be substantially normal thereto and thus no refraction at this rear surface will occur. A hyperhemispherical aplanat 66 which receives these rays and functions in substantially the same manner as element 36 in the earlier-mentioned construction, may likewise be formed of a crown glass of 1.617 index (instead of sapphire), if desired since, together, these refracting elements 62 and 66 will provide a numerical aperture of approximately 1.6 for the light source image at the immersed entrance end of the laser component. The laser component of ruby, or the like, in such an arrangement will be cemented, glass-soldered or fused to glass element 66 at the interface 68 in order to insure intimate optical contact and thus immersion at the entrance end of the component. As in the earlier arrangement, one reflecting coating will be disposed upon the un-immersed end of the component and one upon the flattened vertex of the hyperhemispherical element, as indicated at 69 and 70.

In FIG. 9, a different arrangement of parts is shown. While a first refracting element, much like that used in FIG. 8, is shown at 72 and has an aplanatic front surface 73 arranged to direct the light rays transmitted thereby through its rear surface 74 without refraction and a second refracting element 76 has its front surface 77 similarly aplanatically arranged, and both of these elements are formed of glass of a high refractive index, nevertheless, the rear surface 78 of element 76 is so concavely curved that no refraction of the ray passing therethrough will occur. Thus, it is arranged to receive a hemispherically shaped refracting element 80, formed of sapphire, in such a manner that no refraction will occur at its front surface and the light source image will be formed at the plane of its rear surface. A flattened surface at the vertex of element 80 is arranged to receive the highly reflecting coating 82 which is preferably the 100% reflecting coating while the 2% transmitting reflective coating 84 will be disposed upon the un-immersed end of the laser component, as shown. In this arrangement and using a 1.69 index glass for elements 72 and 76, a system with a N.A. (numerical aperture) as high as 1.72 is possible.

Of course, in FIG. 9, the two coatings 82 and 84 could be reversed, if laser emission in the opposite direction is desired. However, if such is the case, suitable means (not shown) in alignment with the emitted beam might be needed for correcting for the refractive effect of the curved surfaces on elements 72 and 76.

In some instances, it may be desirable to take additional steps in order to prevent the temperature within the laser component from reaching too high an operating temperature, and if such is the case, one or more of the following arrangements might be used. In an arrangement like that of FIG. 1 wherein the large refracting lens 12 is in the system, it is possible to use a lens material which absorbs some of the heat rays from the light source. For instance, where ruby is the laser material and absorbs strongly in between 3400 A. and 6500 A., it is possible to use a lens material which has high transmission in this region but absorbs in other regions.

Also, it is possible to coat the flat surface of the Schmidt lens 12 of FIG. 1 with a known dichroic coating which has high transmission in the 3400 A. to 6500 A. region and high reflectivity in other regions, since the rays at this surface pass nearly normal thereto.

Another arrangement might be to use such a dichroic coating upon the rear surface 64 of the refracting element 62 in FIG. 8, or the rear refracting surface 74 of element 72 of FIG. 9 since the light rays are substantially normal to these surfaces as they pass therethrough.

In FIG. 10, a modified form of resonant cavity structure is disclosed. Instead of having the reflecting surfaces for forming a Fabry-Perot type resonant cavity flat and in facing parallel relation to each other, it is possible to form the vertex surface 86 of the immersing refracting element 88 so as to have a radius of curvature equal to the arrow $S_1$, and form the un-immersed end of the laser component 89 thereof so as to have a radius of curvature equal to the arrow $S_2$. In this way, all points in the reflecting coatings upon the curved surfaces 86 and 90 will tend to focus upon the opposed reflecting surface. Thus, in effect, a spherical type of Fabry-Perot laser cavity will be provided.

As mentioned above, the flux density in the image of the pumping light source entering the laser component, the cross-sectional size of the laser component relative hereto, the length of the component, and the doping or percentage concentration of active ingredient in the laser material are important and interrelated considerations in obtaining laser action. For example, if a three-energy level laser, such as ruby, is being pumped at one end by an image equal to the cross-sectional size thereof and with a certain high flux density, and if the length and doping are such that parts at the far end of the laser component do not receive a sufficient intensity, these parts will quench the laser action. Threshold can be considered as a certain critical amount of absorbed power per unit volume above which the material will laser and below which it will not laser. Thus, the input intensity must be high enough so that the intensity will be above threshold.

In the instant disclosure, the input intensity is approximately twice that for threshold and the length and doping are such that 50% of the energy is absorbed by the time the energy has made one pass through the component and has reached the far end thereof. Then, of course, 50% of the reflected energy will be absorbed as the light makes a return pass through the component. When such a condition exists, if the combined absorbing at the entrance end is considered, it will be at 100%+25% or equal to a 125% rate and at the reflecting end at a 50% rate in each direction or a combined rate of 100%. In a four-energy level laser, quenching is not a problem, but the input flux density must be above threshold.

While each of the laser components so far has been described as being of circular cross-section, since such is preferred, and the image of the light source at its entrance end is also circular and of substantially the same size, it would be possible to use laser components of other cross-sectional shapes, such as square, hexagonal, etc. However, when such a modified cross-section is used, its entrance end should be of such size as to be substantially completely flooded by the light source image; particularly when a three-level laser material is used because of the quenching action of any insufficiently illuminated ions thereof.

Another major problem in obtaining and maintaining a continuous laser operation is the dissipation of heat which is generated within the device. Silver has a very high heat conductivity, and, accordingly, not only the reflecting coating on the sides of the laser component but also parts of the heat sink adjacent thereto should be of silver and should be arranged in intimate contact with the highly reflective coatings upon the laser component.

Since a common method of attaining laser action in a ruby or the like heretofore has been to "side pump" the laser which, in such a case, was a cylindrical rod having silver coatings on its opposite ends, it will be appreciated that end pumping of such a laser could not possibly be accomplished. This, of course, was because such a silvered end would not allow enough pumping light to enter the laser cavity to bring about laser action therewithin. In the present invention, however, this difficulty is avoided since one reflecting surface, either flat or spherically curved as already descibed, is situated at the vertex region of the immersing element which, as shown in FIGS. 5, 7, 8 and 10, is an aplanat and, in FIG. 9, is the hemispherical part 80 of the aplanatic doublet 76 and thus remotely arranged relative to the entrance end or entrance pupil of the laser component.

The amount of pumping light, in an improved construction embodying the present invention, which is vignetted by the reflecting surface is very small in comparison to the remaining area of the surface of the lens element through which the pumping light is entering, and the amount of this vignetted light may be computed as the ratio of the squares of the sine of the half angle subtended by this surface and the sine of the half angle of the illuminating beam (which in cases may approach 90°) when considered relative to the entrance end or entrance pupil thereof. In one specific case, an aplanat of an axial thickness of 19.6 mm. and having its vertex reflecting surface of a diameter of 2.5 mm., the relative vignetting by this surface was found to be $$\left(\frac{1.25}{19.6}\middle/\sin 90°\right)^2 = 0.4\%$$

Thus, it will be appreciated from the foregoing example that the reflecting surface at the vertex of the immersing lens element vignettes less than one-half of one percent of the total pumping energy being directed toward the laser component.

Having described our invention, we claim:

1. A device for use in a laser assembly, said device comprising a laser component of predetermined length and cross-sectional size and formed of an active laser material, refracting optical means including a refracting lens element in optical alignment with and in intimate optical contact with an end wall of said laser component, said refractive lens element having a spherically curved front surface of such predetermined convex curvature as to receive a convergent beam of pumping light of large predetermined angular value and high flux density and direct same at increased flux density into said end of said laser component, a first highly reflecting coating upon the front of said refracting lens element adjacent the vertex thereof, and a second highly reflecting coating upon the end of said laser component remote from said lens element, said first and second coatings being in facing relation to each other so as to form an optical resonant cavity therebetween, at least one of said coatings having a relatively small amount of transmission so as to allow laser light during laser action to pass outwardly therethrough.

2. A device for use in a laser assembly, said device comprising a cylindrically-shaped laser component of predetermined length and cross-sectional size and formed of an active laser material, refracting optical means including a refracting lens element in intimate optical contact with an end of said laser component, said refractive lens element having a spherically curved front surface of such predetermined convex curvature and in such spaced optically aligned relation with said laser component as to receive a convergent beam of pumping light of large predetermined angular value and high flux density and direct same at an increased flux density into said end of said laser component, a first highly reflecting coating upon the front of said refracting lens element adjacent the vertex thereof, and a second highly reflecting coating upon the end of said laser component remote from said lens element and in such opposed spaced facing relation to each other at opposite sides of said laser component as to form with said component an optical resonant cavity therebetween, one of said coatings having a relatively small amount of transmission so as to allow laser light during laser action to pass outwardly therethrough.

3. A device for use in a laser assembly, said device comprising a cylindrically-shaped laser component of predetermined length and cross-sectional size and formed of an active laser material, a highly reflecting coating upon side wall portions of said laser component, refracting optical means including a refracting lens element in intimate optical contact with an end of said laser component, said refractive lens element having a spherically curved front surface of such predetermined convex curvature and in such spaced optically aligned relation with said laser component as to receive a convergent beam of pumping light of high intensity and large predetermined angular value and direct same at an increased angular value and increased intensity into said end of said laser component, a highly reflecting coating upon the front of said refracting lens element adjacent the vertex thereof, and a highly reflecting coating upon the end of said laser component remote from said lens element, said last two reflecting coatings being in such opposed spaced facing relation to each other at opposite sides of said laser component as to form with said component an optical resonant cavity therebetween, one of said coatings having approximately a 2% transmission for allowing laser light during laser action to pass outwardly therethrough.

4. A device for use in a laser assembly, said device comprising a laser component of predetermined length and cross-sectional size and comprising ruby as the active laser material, refracting optical means including a refracting lens element formed of sapphire in optical alignment with and in intimate optical contact with an end of said laser component, said component and said lens element each having a relatively high refractive index, said refractive lens element having a spherically curved front surface of such predetermined convex curvature as to receive a convergent beam of pumping light of high intensity and large predetermined angular value and direct same at increased angular value and increased intensity into said end of said laser component, a first highly reflecting coating upon the front of said refracting lens element adjacent the vertex thereof, and a second highly reflecting coating upon the end of said laser component remote from said lens element, said first and second coatings being in facing relation to each other so as to form an optical resonant cavity therebetween, one of said coatings having approximately a 2% transmission for allowing laser light during laser action to pass outwardly therethrough.

5. A device for use in a laser assembly, said device comprising a laser component of predetermined length and cross-sectional size and formed of an active laser material, refracting optical means including a refracting lens element in intimate optical contact with a wall portion of said laser component, said refractive lens element having a spherically curved front surface of such predetermined convex curvature and in such spaced optically aligned relation with said wall portion as to receive a convergent beam of pumping light of large predetermined angular value and high flux density and direct same at an increased flux density through said wall portion and into said laser component, first and second highly reflecting coatings upon said device and in such opposed spaced facing relation to each other at opposite sides of said laser component as to form with said component an optical resonant cavity therebetween, one of said coatings having a relatively small amount of transmission so as to allow laser light during laser action to pass outwardly therethrough.

6. A device for use in a laser assembly, said device comprising a laser component of predetermined length and cross-sectional size and formed of an active laser material, refracting optical means including a refracting lens element in integral relation with a wall portion of said laser component, said refractive lens element having a spherically curved front surface of such predetermined convex curvature and in spaced optically aligned relation with said wall portion as to receive a convergent beam of pumping light of large predetermined angular value and high flux density and direct same at an increased angular value and increased flux density through said wall portion and into said laser component, first and second highly reflecting coatings upon said device and in such opposed spaced facing relation to each other at opposite sides of said laser component as to form with said component an optical resonant cavity therebetween, one of said coatings having approximately a 2% transmission for allowing laser light during laser action to pass outwardly therethrough.

7. A device for use in a laser assembly, said device comprising a laser component of predetermined length and cross-sectional size and formed of an active laser material, refracting optical means including an aplanatic lens element of high refractive index and having a rear surface thereof in intimate optical contact with a wall portion of said laser component so as to immerse the entrance end of said laser component in said high index material, said lens element having a spherically curved front surface of such predetermined convex curvature and in such spaced optically aligned relation with said rear surface as to receive a convergent beam of pumping light of large predetermined angular value and high flux density and direct same at an increased angular value and increased flux density into the entrance end of said laser component, first and second highly reflecting coatings upon said device and in such opposed spaced facing relation to each other at opposite sides of said laser component as to form with said component an optical resonant cavity therebetween, one of said coatings having approximately a 2% transmission for allowing laser light during laser action to pass outwardly therethrough.

8. A device for use in a laser assembly, said device comprising a laser component of predetermined length and cross-sectional size and formed of an active laser material refracting optical means including an aplanatic lens element of high refractive index and having a rear surface thereof in optical alignment with and in intimate optical contact with an end wall of said laser component so as to immerse said end wall in high index material, said lens element having a spherically curved front surface of such predetermined convex curvature as to receive a convergent beam of pumping light of relatively high intensity and large predetermined angular value and direct same at increased angular value and increased intensity into said end of said laser component, a first highly reflecting coating upon the front of said lens element adjacent the vertex thereof, and a second highly reflecting coating upon the end of said laser component remote from said lens element, said first and second coatings being in facing relation to each other so as to form an optical resonant cavity therebetween, one of said coatings having approximately a 2% transmission for allowing laser light during laser action to pass outwardly therethrough.

9. A device for use in a laser assembly, said device comprising a laser component of predetermined length and cross-sectional size and formed of an active laser material, refracting optical means comprising a meniscus aplanatic lens element and a hyperhemispherical aplanatic lens element in optical alignment, the second aplanatic lens element being of high refractive index and having its rear surface in intimate optical contact with a wall portion of said laser component so as to immerse said wall portion of said component in high index material, each of said lens elements having spherically curved front surfaces of such predetermined convex curvature and in such spaced optically aligned relation with said rear surface as to receive a convergent beam of pumping light of large predetermined angular value and relatively high flux density and direct same at an increased angular value and increased flux density through said wall portion and into said component first and second highly reflecting coatings upon said device and in such opposed spaced facing relation to each other at opposite sides of said component as to form with said component an optical resonant cavity therebetween, one of said coatings having approximately a 2% transmission for allowing laser light during laser action to pass outwardly therethrough.

10. A device for use in a laser assembly, said device comprising a laser component of predetermined length and cross-sectional size and formed of an active laser material, refracting optical means comprising a meniscus aplanatic lens element and a hyperhemispherical lens element in optical alignment, said second aplanatic lens element being of high refractive index and having a rear surface in intimate optical contact with an end wall of said laser component so as to immerse said end wall in high index material, each of said lens elements having a spherically curved front surface of such predetermined convex curvature as to receive a convergent beam of pumping light of relatively high intensity and large predetermined angular value and direct same at increased angular value and increased intensity into said end of said laser component, a first highly reflecting coating upon the front surface of said second lens element and adjacent the vertex thereof, and a second highly reflecting coating upon the end of said laser component remote from said lens elements, said first and second coatings being in facing relation to each other at opposite sides of said laser component so as to form an optical resonant cavity therebetween, one of said coatings having approximately a 2% transmission for allowing laser light during laser action to pass outwardly therethrough.

11. A device for use in a laser assembly, said device comprising a laser component of predetermined length and cross-sectional size and formed of an active laser material, refracting optical means comprising a meniscus aplanatic lens element and a hyperhemispherical aplanatic doublet, said doublet comprising an aplanatic part of a predetermined refractive index and a hemispherically curved part of a higher refractive index and having its rear surface in intimate optical contact with a wall portion of said laser component so as to immerse said wall portion in high index material, said meniscus lens element and said doublet having spherically curved front surfaces of such predetermined convex curvature and in such spaced optically aligned relation with the wall portion of said laser component as to receive a convergent beam of pumping light of large predetermined angular value and relatively high flux density and direct same at an increased angular value and increased flux density through said wall portion and into said laser component, first and second highly reflecting coatings upon said device and in such opposed spaced facing relation to each other at opposite sides of said laser component as to form with said component an optical resonant cavity therebetween, one of said coatings having approximately a 2% transmission for allowing laser light during laser action to pass outwardly therethrough.

12. A device for use in a laser assembly, said device comprising a laser component of predetermined length and cross-sectional size and formed of an active laser material, refracting optical means including a refracting lens element in optical alignment with and in intimate optical contact with an end wall of said laser component, said refractive lens element having a spherically curved front surface of such predetermined convex curvature as to receive a convergent beam of pumping light of large predetermined angular value and direct same at increased angular value into said end of said laser component, a first highly reflecting coating upon the front of said refracting lens element adjacent the vertex thereof, and a second highly reflecting coating upon the end of said laser component remote from said lens element, said first and second coatings being in facing relation to each other so as to form an optical resonant cavity therebetween, at least one of said coatings having a relatively small amount of transmission so as to allow laser light during laser action to pass outwardly therethrough, and heat-transfer means formed of a material of high heat conductivity and disposed in contact with side wall portions of said laser component.

13. A device for use in a laser assembly, said device comprising a laser component of predetermined length and cross-sectional size and formed of an active laser material, refracting optical means including a refracting lens element in intimate optical contact with a wall portion of said laser component, said refractive lens element having a spherically curved front surface of such predetermined convex curvature and in such spaced optically aligned relation with said wall portion as to receive a convergent beam of pumping light of large predetermined angular value and high flux density and direct same at an increased angular value and increased flux density through said wall portion and into said laser component, first and second highly reflecting coatings upon said device and in such opposed spaced facing relation to each other at opposite sides of said laser component as to form with said laser component an optical resonant cavity therebetween, one of said coatings having approximately a 2% transmission for allowing laser light during laser action to pass outwardly therethrough, and heat-transfer means formed of a material of high heat conductivity and disposed in contacting relation with a wall portion of said laser component so as to efficiently absorb and conduct heat away from said component.

14. A device for use in a laser assembly, said device comprising a laser component of predetermined length and cross-sectional size and formed of an active laser material, refracting optical means including a refracting optical element in integral relation with a wall portion of said laser component, said refractive optical element having a spherically curved front surface of such predetermined curvature and in such spaced optically aligned relation with said wall portion as to receive a convergent beam of pumping light of large predetermined angular value and direct same at an increased angular value through said wall portion and into said laser component, first and second highly reflecting coatings upon said device and in such opposed spaced facing relation to each other at opposite sides of said laser component as to form with said component an optical resonant cavity therebetween, one of said coatings having approximately a 2% transmission for allowing laser light during laser action to pass outwardly therethrough, and heat-transfer means formed of a material of high heat conductivity and disposed in contacting relation to side wall portions of said laser component so as to absorb and conduct heat away from said component.

15. A device for use in a laser assembly, said device comprising a laser component of predetermined length and cross-sectional size and formed of an active laser material, refracting optical means including a refracting optical element in integral relation with a wall portion of said laser component, said refractive optical element having a spherically curved front surface of such predetermined curvature and in such spaced optically aligned relation with said wall portion as to receive a convergent beam of pumping light of large predetermined angular value and direct same at an increased angular value through said wall portion and into said laser component, first and second highly reflecting coatings upon said device and in such opposed spaced facing relation to each other at opposite sides of said laser component as to form with said component an optical resonant cavity therebetween, one of said coatings having approximately a 2% transmission for allowing laser light during laser action to pass outwardly therethrough, and heat-transfer means formed of a material of high heat conductivity and disposed in contacting relation to side and end wall portions of said laser component so as to absorb and conduct heat away from said component.

16. A device for use in producing laser light emission comprising a laser component in the form of a thin rod-like member of a predetermined length and of a lesser predetermined diameter, and formed of an active laser material of a predetermined refractive index, an optical element formed of a transparent material of substantially the same refractive index as that of said laser component and in intimate optical contact with an inner end of said laser component, a coating of light-reflecting material disposed upon and covering the outer end of said laser component and of such a character as to be highly reflective to light at the emission wavelength of said laser component, a second coating of light-reflecting material disposed upon a surface of said optical element in predetermined spaced aligned relation to the inner end of said laser component, and of such area and character as to intercept and reflect most of the light at said laser emission wavelength received from said laser component back toward said component and the first-mentioned coating thereon, to thereby form an optical resonant cavity between said coatings, said optical element having an entrance surface for admitting pumping light of a materially greater exposed area than the cross-sectional area of the inner end of said component, and said optical element being of such shape and having such optical characteristics as to direct most of the pumping light so admitted as a beam at increased flux density into the inner end of said laser component, one of said light-reflecting coatings being of such a character as to allow a relatively small percentage of laser light to pass outwardly therethrough.

17. A device for use in producing laser light emission comprising a laser component in the form of a relatively small rod-like member, a relatively massive optical element in intimate optical contact with one end of said laser component, a highly reflective coating on the outer end of the laser component and a highly reflecting coating on the axially opposite surface of said optical element and provided with a relatively small amount of transmission whereby a Fabry-Perot interferometer type of resonant cavity is formed between said reflective surfaces and laser action will occur therebetween when pumping light is imposed on the relatively massive optical element and is thereby directed onto the end of the laser component.

18. The device of claim 17 in which the laser component is immersed in a mass of heat conducting material.

19. A device for use in producing laser light emission comprising a ruby laser component in the form of a relatively small rod-like member, a relatively massive sapphire optical element in intimate optical contact with one end of said ruby laser component, a highly reflective coating on the outer end of the ruby laser component and a highly reflecting coating on the axially opposite surface of the sapphire optical element and provided with a relatively small amount of transmission whereby a Fabry-Perot interferometer type of resonant cavity is formed between said reflective surfaces and laser action will occur therebetween when pumping light is imposed on the sapphire optical element and is thereby refracted onto the end of the ruby laser component.

20. The device of claim 19, in which the ruby laser component is immersed in a solid mass of heat conducting material which constitutes a heat sink.

21. A solid state element for use in an optical maser of the type in which coherent optical energy is stimulated in an active material when pumped to an inverted population condition by means including a light source and means for directing the light therefrom so as to be incident upon said active material, said solid state element comprising an elongated rod-like first portion which is formed of said active material and includes active ions in a crystalline host lattice, and an enlarged second portion having an entrance surface of appreciable size for admitting optical energy into said solid state element and a smaller surface in opposed spaced relation thereto, said smaller surface being in contiguous relation with an end surface of said rod-like first portion, said enlarged second portion being substantially transparent to light of the wavelength to be stimulated and to the light of the wavelengths to be employed to pump said active ions.

22. An element as claimed in claim 21 wherein said first portion is ruby and said second portion is sapphire.

23. In combination, an elongated rod of active maser material adapted to entrap by internal reflection light rays incident on an end surface thereof, means including a pair of reflecting elements aligned with opposite ends of said rod for forming an optical resonant cavity including the rod, means for pumping the rod to invert the population distribution between a pair of energy states therein comprising a light source and means for directing the light therefrom to incidence on an end surface of said rod, said light directing means comprising a light collecting element having a refractive index substantially matching that of said rod and having an exposed larger surface and a smaller surface contiguous to an end of said rod in the path of light rays directed thereat from said light source, and means for abstracting from said resonant cavity coherent light wave energy of the frequency corresponding to the energy separation of said inverted states.

24. A laser comprising a resonator including an active element, means for applying pumping radiation to only a relatively small portion of said active element to produce population inversion and resulting stimulated emission in said resonator and means for deriving coherent radiation from said resonator.

25. A resonator for a laser comprising a solid state active element having parallel first and second end surfaces and first and second contiguous portions serially aligned between said end surfaces, said first portion having a given cross-sectional area parallel to said end surfaces and said second portion having a cross-sectional area parallel to said end surfaces substantially greater than that of said given cross-sectional area, and first and second reflecting means applied to said first and second end surfaces, respectively.

26. A laser comprising a resonator including an active element, means for inverting the population at only one end portion of said active element to produce stimulated emission therein and means for deriving coherent radiation from said resonator.

27. A laser comprising a resonator including a single crystal element having an active portion and an inactive portion disposed on one side of said active portion, means for exciting only said active portion so as to produce radiations therein by stimulated emission and means for extracting said radiations from said active portion.

28. A resonator for a laser producing coherent radiation comprising a single crystal element having an active portion and an inactive portion disposed on one side of said active portion and first and second means for reflecting said radiations, said active portion being disposed between said first and second reflecting means, at least a section of said inactive portion being disposed between said active portion and one of said reflecting means.

References Cited

Schmeck: Gain Is Reported in Optical Maser, New York Times (Jan. 25, 1962), p. 13.

New Solid-State Laser Described by Bell Labs, Missiles and Rockets, vol. 10 No. 5 (Jan. 29, 1962), p. 36.

WILLIAM L. SIKES, Primary Examiner